United States Patent
Ratajac

(10) Patent No.: US 10,780,987 B2
(45) Date of Patent: Sep. 22, 2020

(54) FAN COWL LATCH CONCEPT FOR FUSELAGE MOUNTED POWER PLANT

(71) Applicant: Rohr, Inc., Chula Vista, CA (US)

(72) Inventor: Aleksandar Ratajac, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 330 days.

(21) Appl. No.: 15/944,603

(22) Filed: Apr. 3, 2018

(65) Prior Publication Data

US 2019/0300189 A1   Oct. 3, 2019

(51) Int. Cl.
| | |
|---|---|
| *B64D 29/06* | (2006.01) |
| *E05C 3/00* | (2006.01) |
| *E05C 19/10* | (2006.01) |
| *B64D 27/20* | (2006.01) |
| *B64D 29/04* | (2006.01) |
| *E05C 3/04* | (2006.01) |
| *E05B 9/00* | (2006.01) |
| *B64D 29/08* | (2006.01) |

(52) U.S. Cl.
CPC ............. *B64D 29/06* (2013.01); *B64D 27/20* (2013.01); *B64D 29/04* (2013.01); *B64D 29/08* (2013.01); *E05B 9/00* (2013.01); *E05C 3/004* (2013.01); *E05C 3/045* (2013.01); *E05C 19/10* (2013.01)

(58) Field of Classification Search
CPC .......... B64C 7/02; B64D 29/06; B64D 29/08; E05C 19/10; E05C 3/004; E05C 3/045; E05B 9/00
See application file for complete search history.

(56) References Cited

U.S. PATENT DOCUMENTS

| | | | |
|---|---|---|---|
| 2,710,214 A | 6/1955 | Mills | |
| 3,347,578 A * | 10/1967 | Sheehan | B64D 29/06 292/113 |
| 4,946,116 A | 8/1990 | Vander Hoek | |

(Continued)

FOREIGN PATENT DOCUMENTS

| | | |
|---|---|---|
| DE | 678518 | 7/1939 |
| EP | 1091059 | 4/2001 |
| FR | 3054827 | 2/2018 |

OTHER PUBLICATIONS

European Patent Office, European Search Report dated Jul. 17, 2019 in Application No. 19166487.9.

*Primary Examiner* — Philip J Bonzell
*Assistant Examiner* — Tye William Abell
(74) *Attorney, Agent, or Firm* — Snell & Wilmer L.L.P.

(57) ABSTRACT

An aircraft cowl arrangement may comprise a first half, and a second half rotatable between an open position and a closed position, a first seal coupled to the first half, a second seal coupled to the second half, and a latch arrangement for preventing relative movement between the first half and the second half. The latch arrangement may comprise a tie rod comprising a first end coupled to the first half, a second end, and a frame having an opening for receiving the second end of the tie rod, a latch handle rotatably mounted to the frame, and a hook operably coupled to the latch handle, wherein the latch handle is configured to move between a first position wherein the hook is engaged with the second end of the tie rod and a second position wherein the hook is disengaged from the second end of the tie rod.

16 Claims, 8 Drawing Sheets

(56) References Cited

U.S. PATENT DOCUMENTS

| | | | |
|---|---|---|---|
| 5,915,765 A | 6/1999 | Sternberger | |
| 6,145,786 A | 11/2000 | Baudu et al. | |
| 6,216,980 B1 | 4/2001 | Baudu et al. | |
| 7,146,796 B2 | 12/2006 | Lair | |
| 2009/0051170 A1* | 2/2009 | Baic | E05B 15/0006 292/113 |
| 2016/0264249 A1 | 9/2016 | Lozano et al. | |
| 2017/0211296 A1* | 7/2017 | Do | B64D 29/08 |
| 2019/0112063 A1* | 4/2019 | Byrne | F01D 25/24 |
| 2020/0031483 A1* | 1/2020 | Guillois | B64D 27/26 |

* cited by examiner

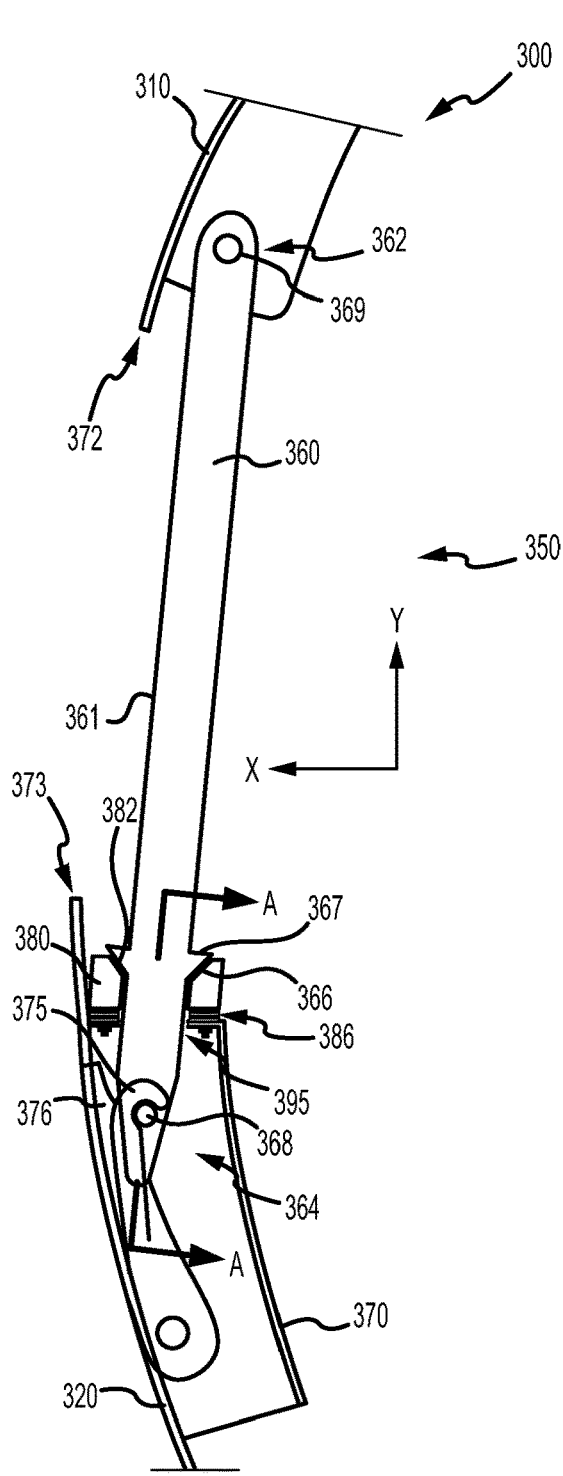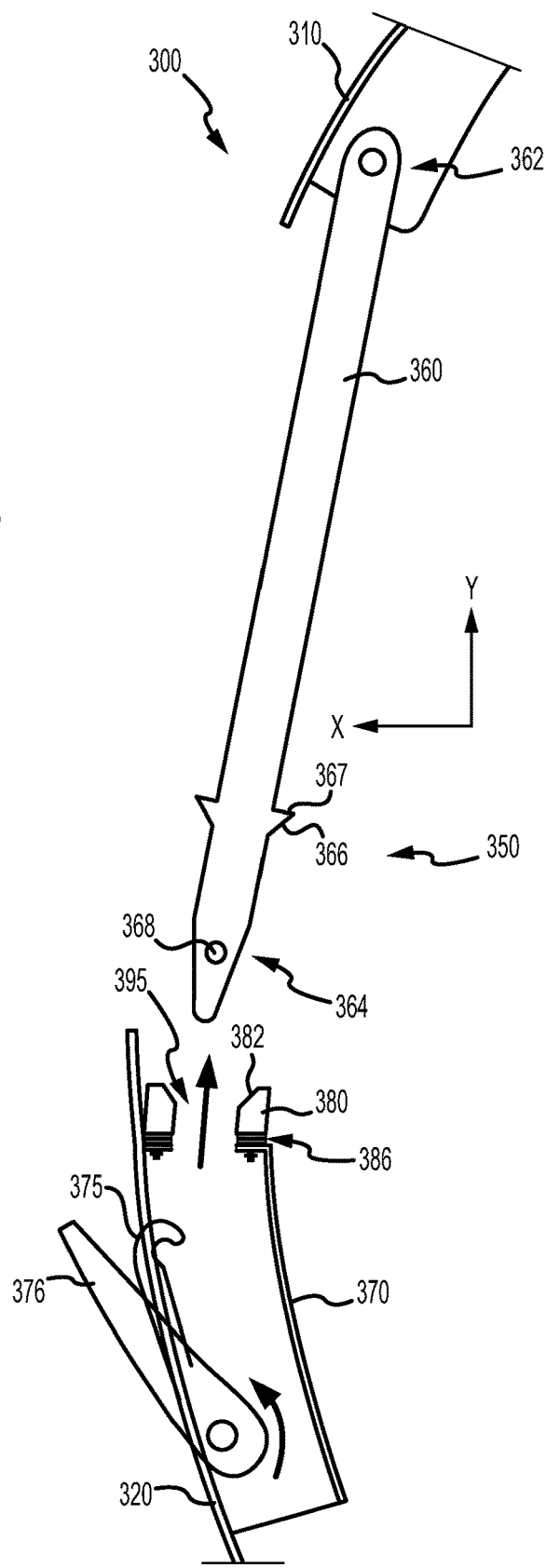
FIG.3A
FIG.3B

A-A

FAN COWL LATCH CONCEPT FOR FUSELAGE MOUNTED POWER PLANT

FIELD

The disclosure generally relates to gas turbine propulsion systems for aircraft, and more particularly to the design of a fan cowl latch for fuselage mounted gas turbine propulsion systems.

BACKGROUND

Modern aircraft may utilize one or more gas turbine engines. A gas turbine engine may be housed in a nacelle. Often, the nacelle includes a fan cowl. The fan cowl may include two doors. Typically, fan cowl door latches join two adjacent fan cowl doors. A fuselage mounted design may have a large gap between the fan cowl doors caused by the pylon structure that has to be bridged by a latching device. The large gap may compromise control of fire seal compression of the nacelle. In addition, the latching device may experience tension and compression due to the latching device bridging the pylon structure.

SUMMARY

A latch arrangement is disclosed, comprising a tie rod comprising a first end and a second end, a frame having an opening for receiving the second end of the tie rod, a latch handle rotatably mounted to the frame, and a hook operably coupled to the latch handle, wherein the latch handle is configured to move between a first position wherein the hook is engaged with the second end of the tie rod and a second position wherein the hook is disengaged from the second end of the tie rod.

In various embodiments, the opening is at least partially defined by a first contacting surface.

In various embodiments, the second end comprises a second contacting surface having a geometry which is complementary to the first contacting surface.

In various embodiments, the latch arrangement may further comprise a bumper extending from the frame at the opening, wherein the bumper is at least partially defined by the first contacting surface.

In various embodiments, the latch arrangement may further comprise a flange disposed on the tie rod, wherein the flange is at least partially defined by the second contacting surface.

In various embodiments, the bumper and the flange provide a first load path for compressive loads between the tie rod and the frame.

In various embodiments, the latch arrangement may further comprise a pin extending from the second end, wherein the pin and the hook provide a second load path for tensile loads between the tie rod and the hook.

In various embodiments, the latch arrangement may further comprise a plurality of shims disposed between the bumper and the frame.

In various embodiments, the tie rod comprises a first rod, a second rod, and a rotatable member whereby the first rod is coupled to the second rod and wherein rotation of the rotatable member with respect to at least one of the first rod and the second rod at least one of increases and decreases a length of the tie rod.

An aircraft cowl arrangement is disclosed, comprising a first half, and a second half, wherein the first half and the second half are rotatable between an open position and a closed position, a first seal coupled to the first half, a second seal coupled to the second half, and a latch arrangement for preventing relative movement between the first half and the second half, comprising a tie rod comprising a first end and a second end, wherein the first end is coupled to the first half, and a frame having an opening for receiving the second end of the tie rod, a latch handle rotatably mounted to the frame, and a hook operably coupled to the latch handle, wherein the latch handle is configured to move between a first position wherein the hook is engaged with the second end of the tie rod and a second position wherein the hook is disengaged from the second end of the tie rod.

In various embodiments, the opening is at least partially defined by a first contacting surface, wherein the second end comprises a second contacting surface having a geometry which is complementary to the first contacting surface.

In various embodiments, the tie rod extends across a pylon in response to the first half and the second half being in the closed position.

In various embodiments, the first seal and the second seal contact the pylon in response to the first half and the second half being closed.

In various embodiments, the aircraft cowl arrangement may further comprise a bumper extending from the frame at the opening, wherein the bumper is at least partially defined by the first contacting surface.

In various embodiments, the aircraft cowl arrangement may further comprise a flange disposed on the tie rod, wherein the flange is at least partially defined by the second contacting surface, wherein the bumper and the flange provide a first load path for compressive loads between the tie rod and the frame.

In various embodiments, the aircraft cowl arrangement may further comprise a pin extending from the second end, wherein the pin and the hook provide a second load path for tensile loads between the tie rod and the hook.

In various embodiments, the aircraft cowl arrangement may further comprise a plurality of shims disposed between the bumper and the frame.

In various embodiments, the tie rod comprises a first rod, a second rod, and a rotatable member whereby the first rod is coupled to the second rod and wherein rotation of the rotatable member with respect to at least one of the first rod and the second rod at least one of increases and decreases a length of the tie rod.

A method of installing a fan cowl arrangement is disclosed, comprising coupling a first end of a tie rod to a first half of the fan cowl, coupling a frame to a second half of the fan cowl, wherein the frame includes a latch handle rotatably coupled to the frame and a hook operably coupled to the latch handle, coupling a bumper to the frame, and positioning a second end of the tie rod to extend through the bumper.

In various embodiments, the method further comprises positioning one or more shims between the frame and the bumper to adjust a distance between the first half and the second half.

In various embodiments, the method further comprises moving a rotatable member with respect to the tie rod to adjust the distance between the first half and the second half.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3A illustrates a sectional view of a latch arrangement for a fuselage mounted fan cowl in a closed position, in accordance with various embodiments;

FIG. 3B illustrates a sectional view of a latch arrangement for a fuselage mounted fan cowl in an open position, in accordance with various embodiments;

DETAILED DESCRIPTION

Figure 1:
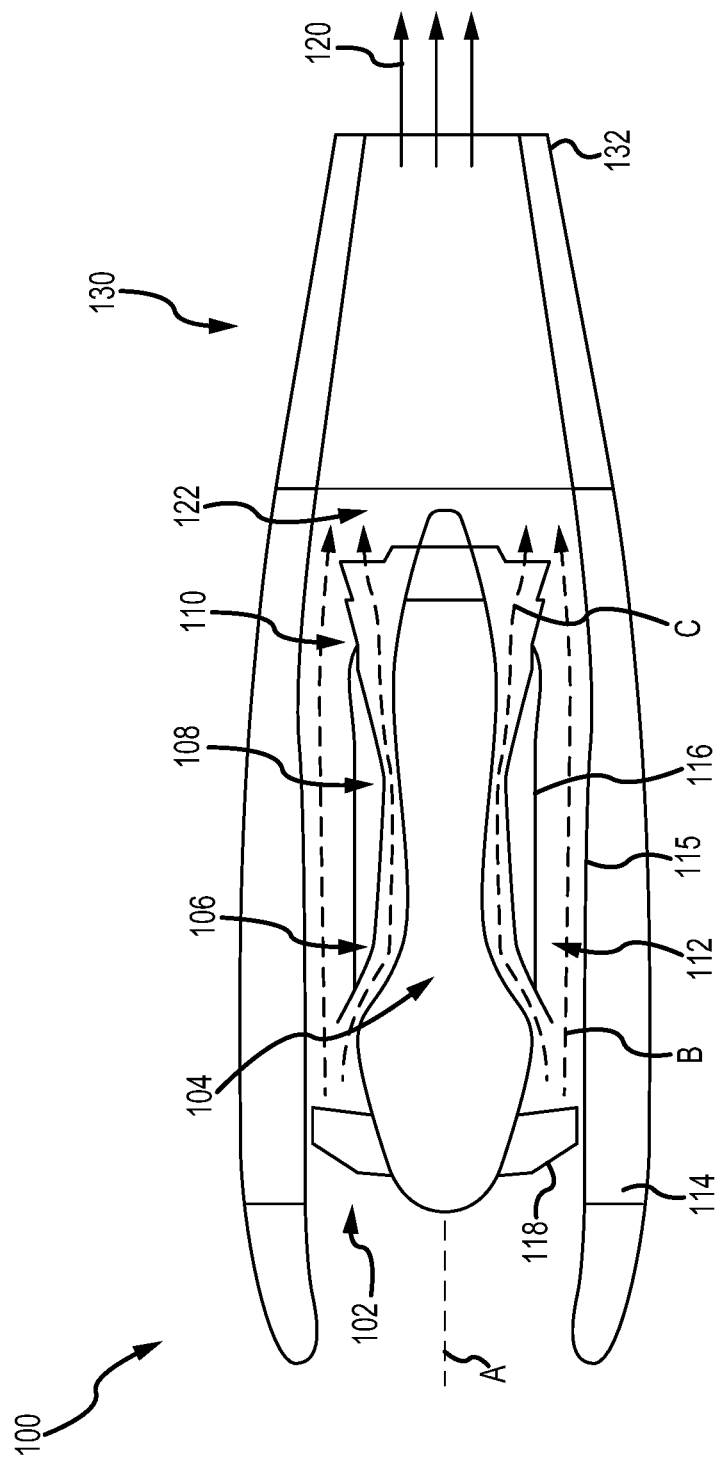
FIG. 1 illustrates a schematic view of a nacelle surrounding a gas turbine engine, in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Modern aircraft may utilize one or more gas turbine engines. A gas turbine engine may be housed in a nacelle. Often, the nacelle includes a fan cowl. The fan cowl may include two doors. Typically, fan cowl door latches join two adjacent fan cowl doors. A fuselage mounted design may have a large gap between the fan cowl doors caused by the pylon structure that has to be bridged by a latching device. The large gap may compromise control of fire seal compression of the nacelle. In addition, the latching device may experience tension and compression due to the latching device bridging the pylon structure.

A latch arrangement, as disclosed herein, may include a tie rod extending between a first fan cowl half and a second fan cowl half. The fan cowl halves may comprise panels (such as carbon composite panels for example) formed to surround a core engine. The tie rod may operatively couple to a latch hook for securing the tie rod to the second fan cowl half, thereby securing the two fan cowl halves in a closed position and providing a load path for tensile forces between the two fan cowl halves. The tie rod may include a contacting surface for contacting a bumper of the latch housing, providing a load path for compressive load forces between the two fan cowl halves. The latch arrangement may further comprise members for adjusting the distance between the fan cowl halves as desired for properly positioning fire seals against a pylon.

With reference to FIG. 1, a gas turbine engine 100 of a mixed flow turbofan variety is schematically illustrated, in accordance with various embodiments. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within inner surface 115 and an outer casing 116 of the core engine section 104, while the compressor section 106 drives air along a core flow path C of the core engine section 104 for compression and communication into the combustor section 108 and then expansion through the turbine section 110. A nacelle 114 may surround core engine section 104 and provide a generally aerodynamic profile.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a stowed position (also referred to as a closed position or a retracted position), as illustrated in FIG. 1.

Figure 2A:
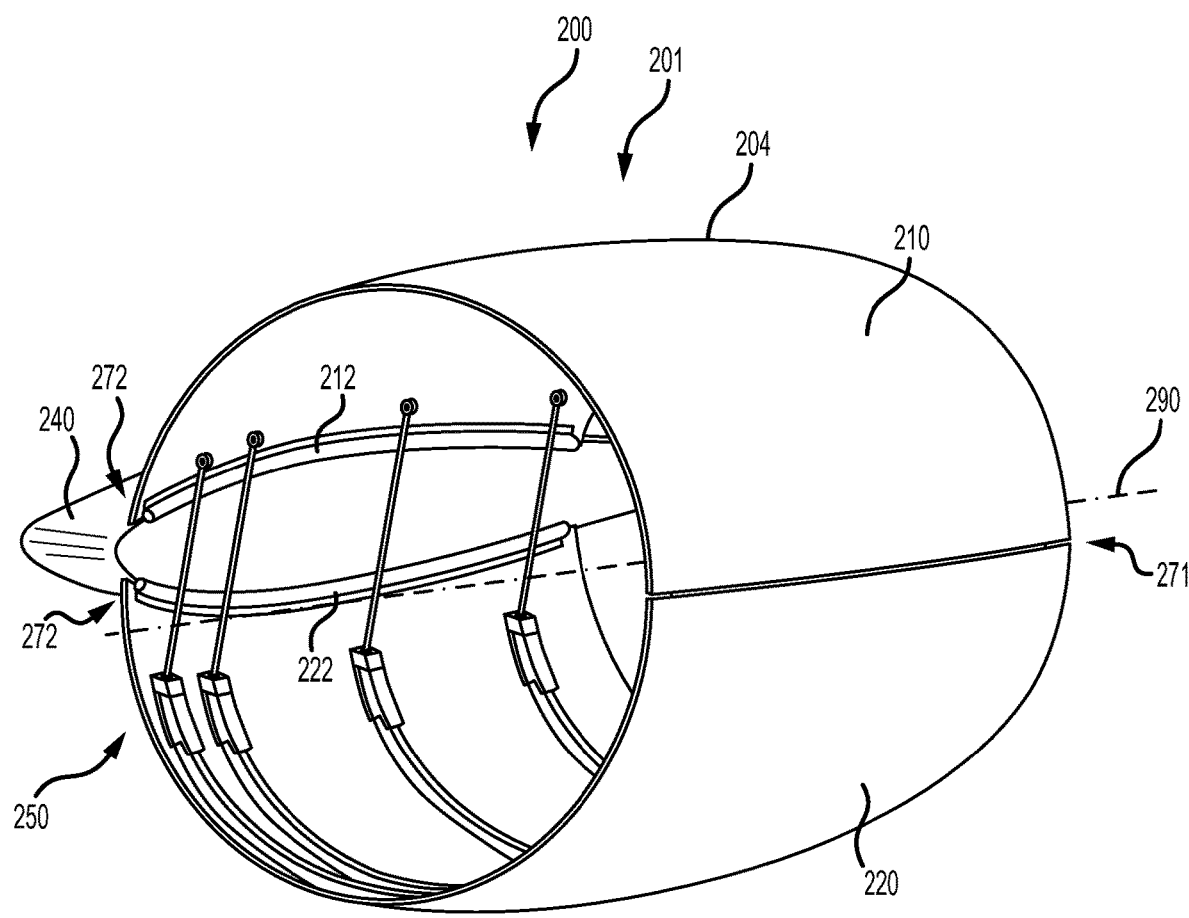
FIG. 2A illustrates a perspective view of a fuselage mounted fan cowl in a closed position, in accordance with various embodiments.
Figure 2B:
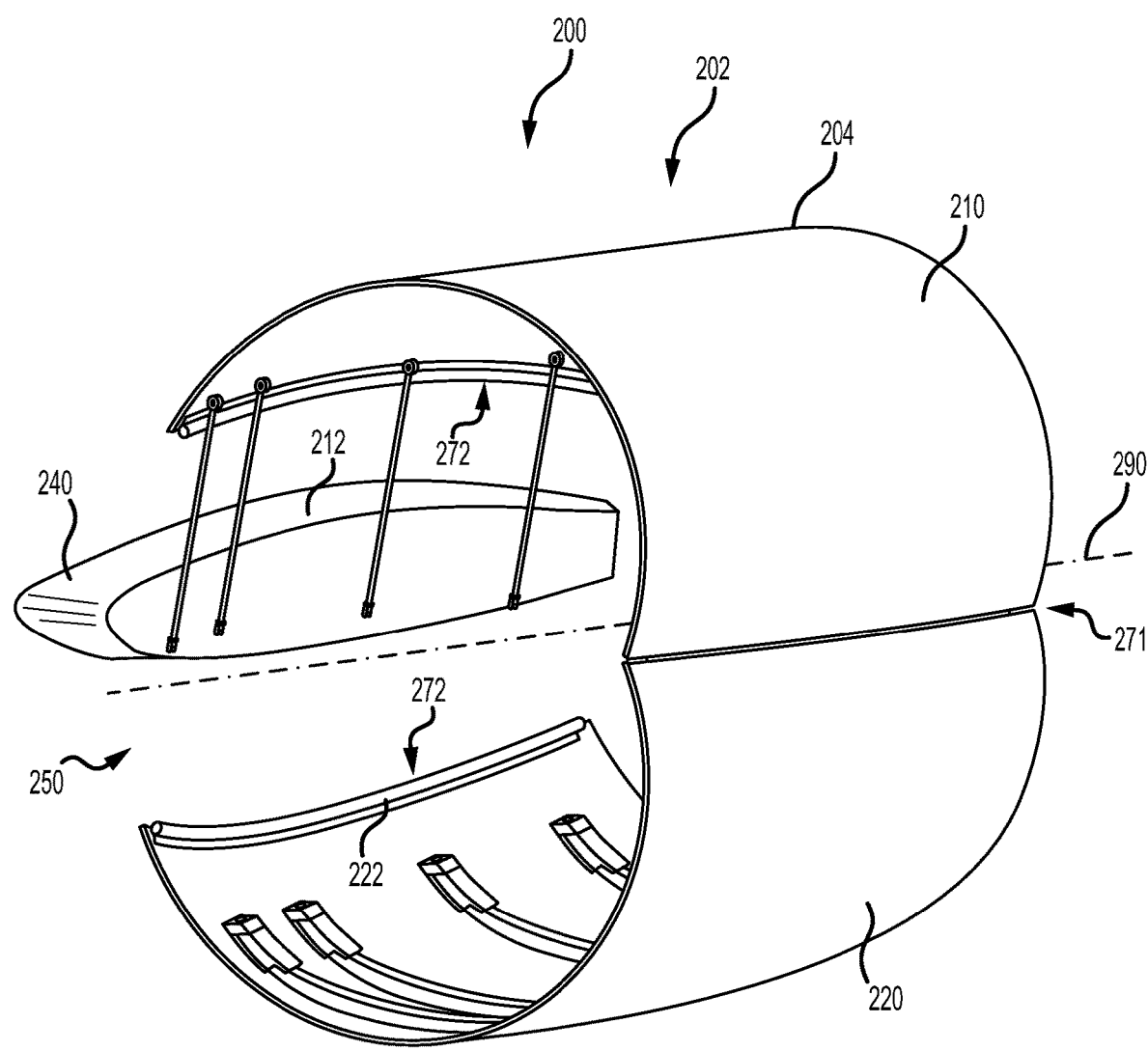
FIG. 2B illustrates a perspective view of a fuselage mounted fan cowl in an open position, in accordance with various embodiments.

With combined reference to FIG. 2A and FIG. 2B, a fan cowl arrangement 200 for a gas turbine engine is illustrated according to various embodiments. Fan cowl arrangement 200 may include a fan cowl 204. Fan cowl 204 may at least partially enclose a gas turbine engine. Fan cowl 204 may extend along a centerline axis 290. In various embodiments, centerline axis 290 may be co-axial with centerline axis A of FIG. 1. Fan cowl 204 may be coupled to a pylon 240, which may mount fan cowl 204 to an aircraft body. Fan cowl 204 may further be split into a first half 210 and a second half 220. The first half 210 and the second half 220 may hinge open at a first side 271 in order to provide access to an engine. The first half 210 and the second half 220 may each comprise a second side 272 which seal against pylon 240. Stated differently, first half 210 and a second half 220 may be rotatable between a closed position 201, as illustrated in FIG. 2A, and an open position 202, as illustrated in FIG. 2B.

First half 210 may include a seal (also referred to herein as a first seal) 212 coupled to first half 210 at second end 272. Seal 212 may contact pylon 240 in response to first half 210 being in the closed position 201. Second half 220 may include a seal (also referred to herein as a second seal) 222 coupled to second half 220 at second end 272. Seal 222 may contact pylon 240 in response to second half 220 being in the closed position 201. Seal 212 may be compressed between first half 210 and pylon 240 and seal 222 may be compressed between second half 220 and pylon 240 in response to fan cowl 204 being in the closed position 201.

The distance between second end 272 of first half 210 and second end 272 of second half 220 may be adjustable via one or more latch arrangements 250 coupled between first half 210 and second half 220.

With reference to FIG. 3A, a schematic view, looking axially, of a fan cowl arrangement 300 in a closed position is illustrated, in accordance with various embodiments. In various embodiments, fan cowl arrangement 200 of FIG. 2A and FIG. 2B may be similar to fan cowl arrangement 300. Fan cowl arrangement 300 may include a first half 310 and a second half 320. Fan cowl arrangement 300 may include a latch arrangement 350. Latch arrangement 250 may be similar to latch arrangement 350, with momentary reference to FIG. 2A. Fan cowl arrangement 300 may include a first seal coupled to first half 310, similar to first seal 212 of FIG. 2A, and may include a second seal coupled to second half 320, similar to second seal 222 of FIG. 2A. However, these seals are omitted for clarity purposes in FIG. 3A and FIG. 3B.

Latch arrangement 350 may comprise a rod (also referred to herein as a tie rod) 360 comprising a first end 362 and a second end 364. Latch arrangement 350 may include a frame 370 having an opening 395 for receiving the second end 364 of tie rod 360. Latch arrangement 350 may include a latch handle 376 operably coupled to a hook 375. Latch handle 376 may be rotatably mounted to the frame 370 and configured to move between a first position (also referred to herein as a closed position and as illustrated in FIG. 3A) wherein the hook 375 is engaged with the second end 364 of the tie rod 360 and a second position (also referred to herein as an open position and as illustrated in FIG. 3B) wherein the hook 375 is disengaged from the second end 364 of the tie rod 360.

In various embodiments, a pin 368 may extend from second end 364 of tie rod 360. In the first position, as illustrated in FIG. 3A, hook 375 may engage pin 368, whereby tie rod 360 may be secured to second half 320. In the second position, as illustrated in FIG. 3B, hook 375 may be disengaged from pin 368, whereby tie rod 360 is decoupled from second half 320. Hook 375 may be operatively coupled to latch handle 376 via any suitable means known by a person having ordinary skill in the art whereby hook 375 releases pin 368 in response to latch handle 376 being moved to the open position as illustrated in FIG. 3B.

Figure 4A:
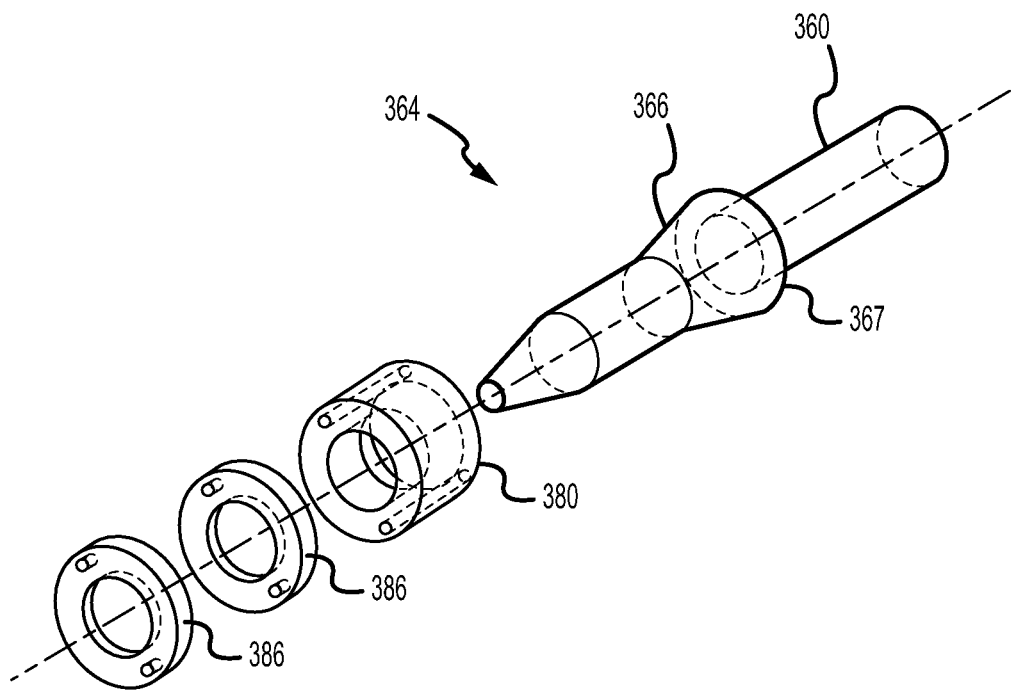
FIG. 4A illustrates an exploded view of a tie rod having a conical contacting surface, a bumper, and a plurality of shims, in accordance with various embodiments.
Figure 4B:
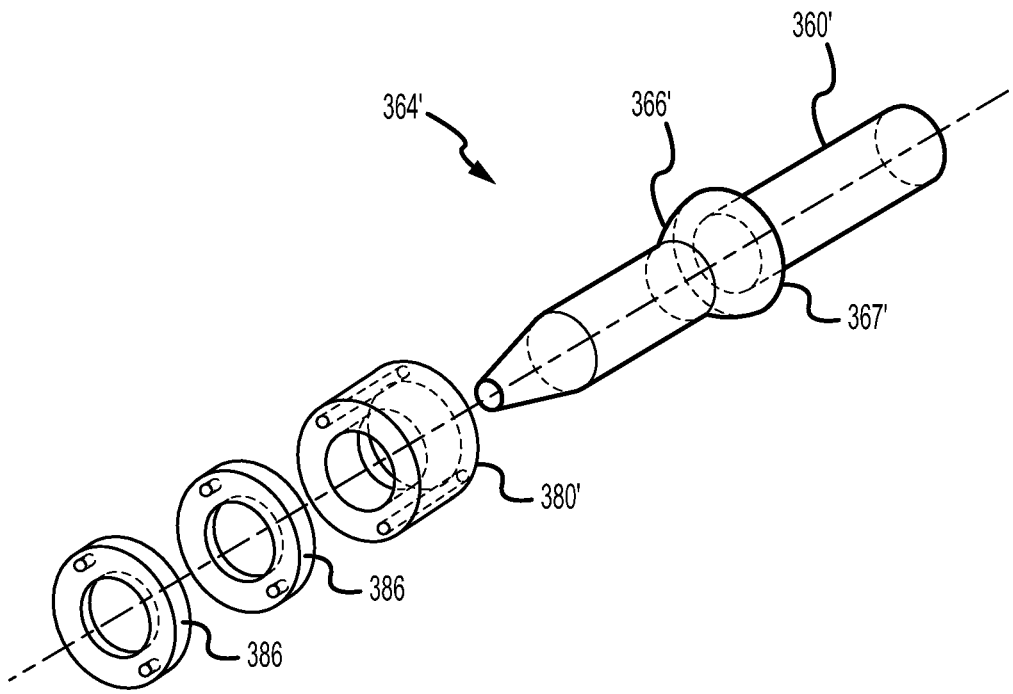
FIG. 4B illustrates an exploded view of a tie rod having a spherical contacting surface, a bumper, and a plurality of shims, in accordance with various embodiments.

In various embodiments, tie rod 360 may include a contacting surface (also referred to herein as a second contacting surface) 366 defined by a flange 367 projecting from the outer surface 361 of tie rod 360. In various embodiments, tie rod 360 may comprise a cylindrical geometry, wherein the flange 367 comprises an annulus disposed on the outer surface 361 of tie rod 360. In various embodiments, contacting surface 366 may comprise a conical geometry truncated by tie rod 360, as illustrated in FIG. 4A. In various embodiments, contacting surface 366' may comprise a hemispherical geometry truncated by tie rod 360', as illustrated in FIG. 4B.

In various embodiments, frame 370 may include a bumper 380 extending from frame 370 at opening 395. Bumper 380 may include a contacting surface (also referred to herein as a first contacting surface) 382. In this regard, opening 395 may be at least partially defined by contacting surface 382. The geometry of contacting surface 382 may be complementary to the geometry of contacting surface 366. For example, if contacting surface 366 is a conical geometry, then contacting surface 382 may be a similar conical geometry against which contacting surface 366 may evenly contact. Bumper 380 may comprise an annulus configured to receive second end 364 of tie rod 360. In this regard, contacting surface 382 may comprise an annulus.

In various embodiments, latch arrangement 350 may include a plurality of shims 386 disposed between frame 370 and bumper 380. With combined reference to FIG. 3A and FIG. 2A, the number of shims 386 may be chosen such that seal 212 and seal 222 are properly seated against pylon 240. For example, the number of shims 386 may be chosen such that, in closed position 201, seal 212 and seal 222 are compressed against pylon 240 and contacting surface 366 is compressed against contacting surface 382. In this manner, plurality of shims 386 may effectively adjust the distance between second ends 272 of first half 210 and second half 220.

In various embodiments, the number of shims 386 may be chosen such that contacting surface 366 is in contact with contacting surface 382 in response to latch handle 376 being in the closed position. The number of shims 386 may be chosen such that contacting surface 366 is compressed against contacting surface 382 in response to latch handle 376 being in the closed position.

In various embodiments, latch arrangement 350 may be suitable for handling both compressive loads and tensile loads between first half 310 and second half 320. Compressive loads may be transferred between bumper 380 and flange 367. In this regard, a first load path may be formed between bumper 380 and flange 367 of tie rod 360 for transferring compressive loads. Tensile loads may be transferred between hook 375 and pin 368. In this regard, a second load path may be formed between hook 375 and pin 368 for transferring tensile loads.

Figure 5A:
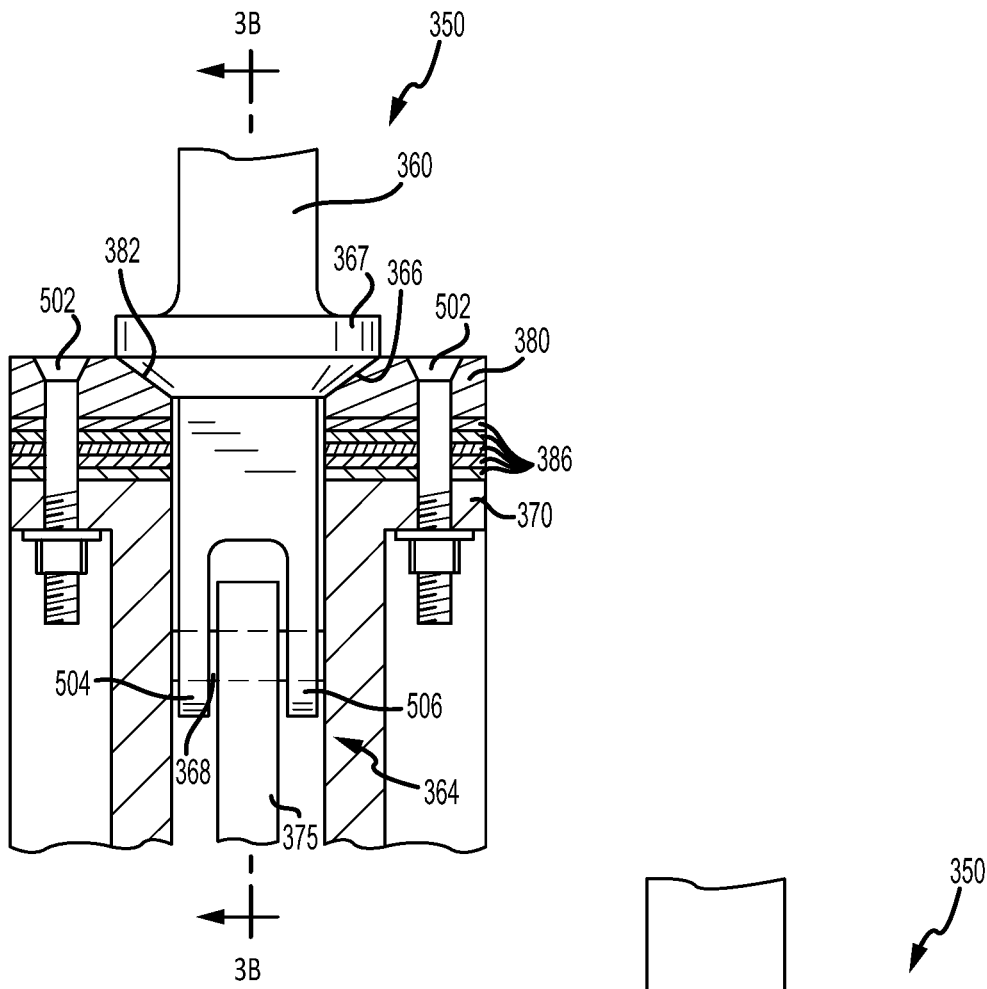
FIG. 5A illustrates a cross-section view of the latch arrangement of FIG. 3A, in accordance with various embodiments.

With reference to FIG. 5A, a cross-section view of latch arrangement 350, looking in the radial direction, is illustrated, in accordance with various embodiments. Bumper 380 may be coupled to frame 370 via one or more fasteners 502. Fastener 502 may be a bolt, for example. Shims 386 may be compressed between bumper 380 and frame 370 via fastener 502. In this regard, fastener 502 may extend between bumper 380 and frame 370.

In various embodiments, second end 364 of tie rod 360 may comprise a U-shaped end having pin 368 extending between the end. Stated differently, second end 364 may comprise a first lobe 504 and a second lobe 506 with pin 368 extending between first lobe 504 and second lobe 506.

Figure 5B:
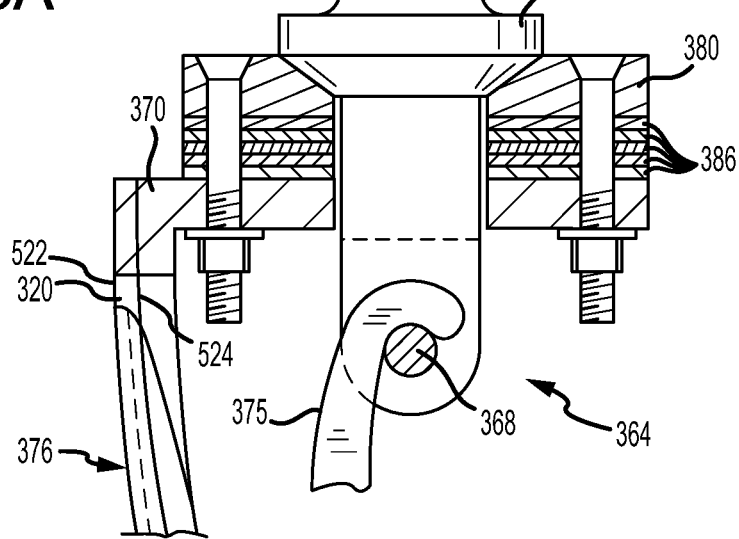
FIG. 5B illustrates a cross-section view of the latch arrangement of FIG. 5A, in accordance with various embodiments.

With reference to FIG. 5B, a cross-section view, perpendicular to the cross-section view of FIG. 5A, of latch arrangement 350 is illustrated, in accordance with various embodiments. In various embodiments, second half 320 may comprise an outer surface 522 and an inner surface 524. Outer surface 522 may be an aerodynamic surface. In various embodiments, latch handle 376 may be flush with outer surface 522. Inner surface 524 may be a radially inner surface. Frame 370 may be coupled to inner surface 524 of second half 220.

Figure 6:
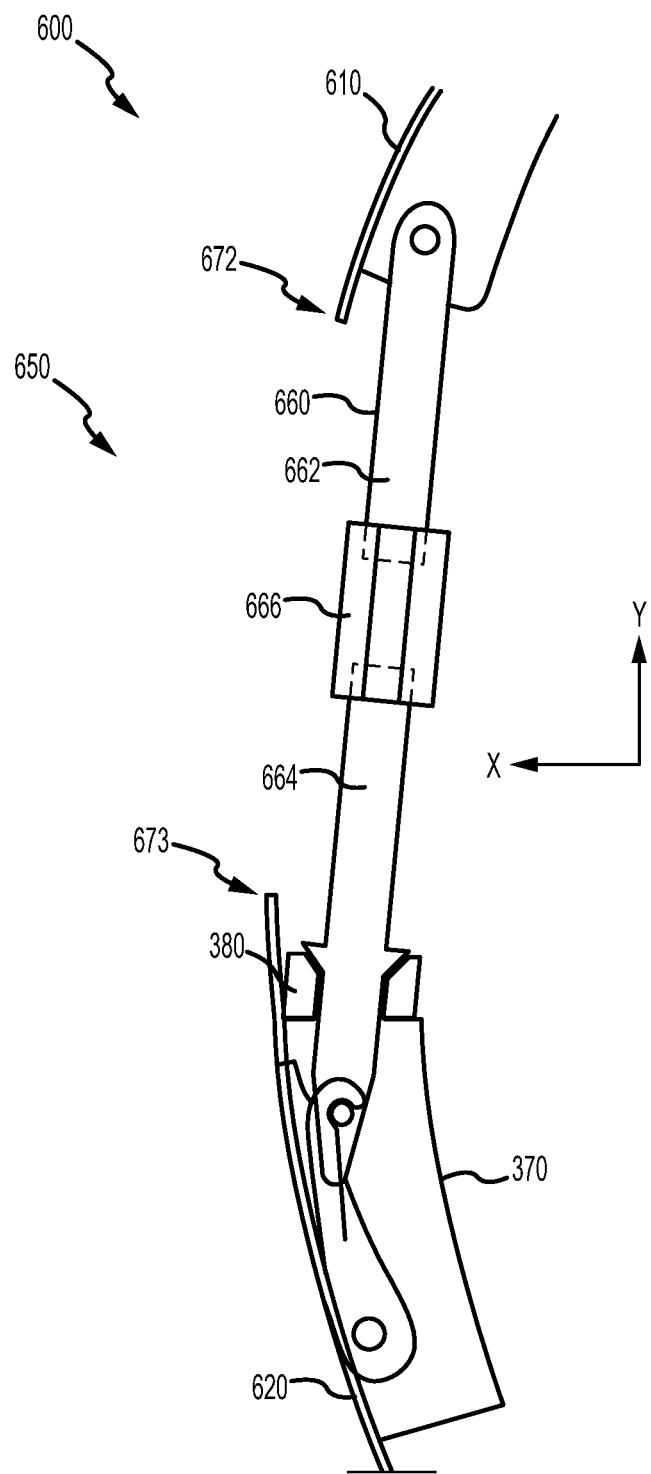
FIG. 6 illustrates a sectional view of a latch arrangement for a fuselage mounted fan cowl having a turnbuckle style tie rod, in a closed position, in accordance with various embodiments.

With reference to FIG. 6, a schematic view, looking axially, of a fan cowl arrangement 600 in a closed position is illustrated, in accordance with various embodiments. In various embodiments, fan cowl arrangement 200 of FIG. 2A may be similar to fan cowl arrangement 600. Fan cowl arrangement 600 may be similar to fan cowl arrangement 300 of FIG. 3A, except that, instead of having a plurality of shims, fan cowl arrangement 600 includes a turn-buckle style tie rod for adjusting the distance between a first half 610 of a fan cowl and a second half 620 of the fan cowl. In this regard, fan cowl arrangement 600 may include a latch arrangement 650 having a turn-buckle tie rod 660. Tie rod 660 may include a first rod 662 and a second rod 664. First rod 662 and/or second rod 664 may be threadingly coupled to a rotatable member 666. Rotation of rotatable member 666 with respect to at least one of first rod 662 and a second rod 664 in a first direction may increase the length of tie rod 660. Rotation of rotatable member 666 with respect to at least one of first rod 662 and a second rod 664 in a second direction may decrease the length of tie rod 660. In this manner, tie rod 660 may be adjusted for proper fitment for fan cowl arrangement 600. In this regard, bumper 380 may be attached directly to frame 370. In various embodiments, bumper 380 and frame 370 may be two separate parts. In various embodiments, bumper 380 and frame 370 may be made from a single piece of material.

Figure 7:
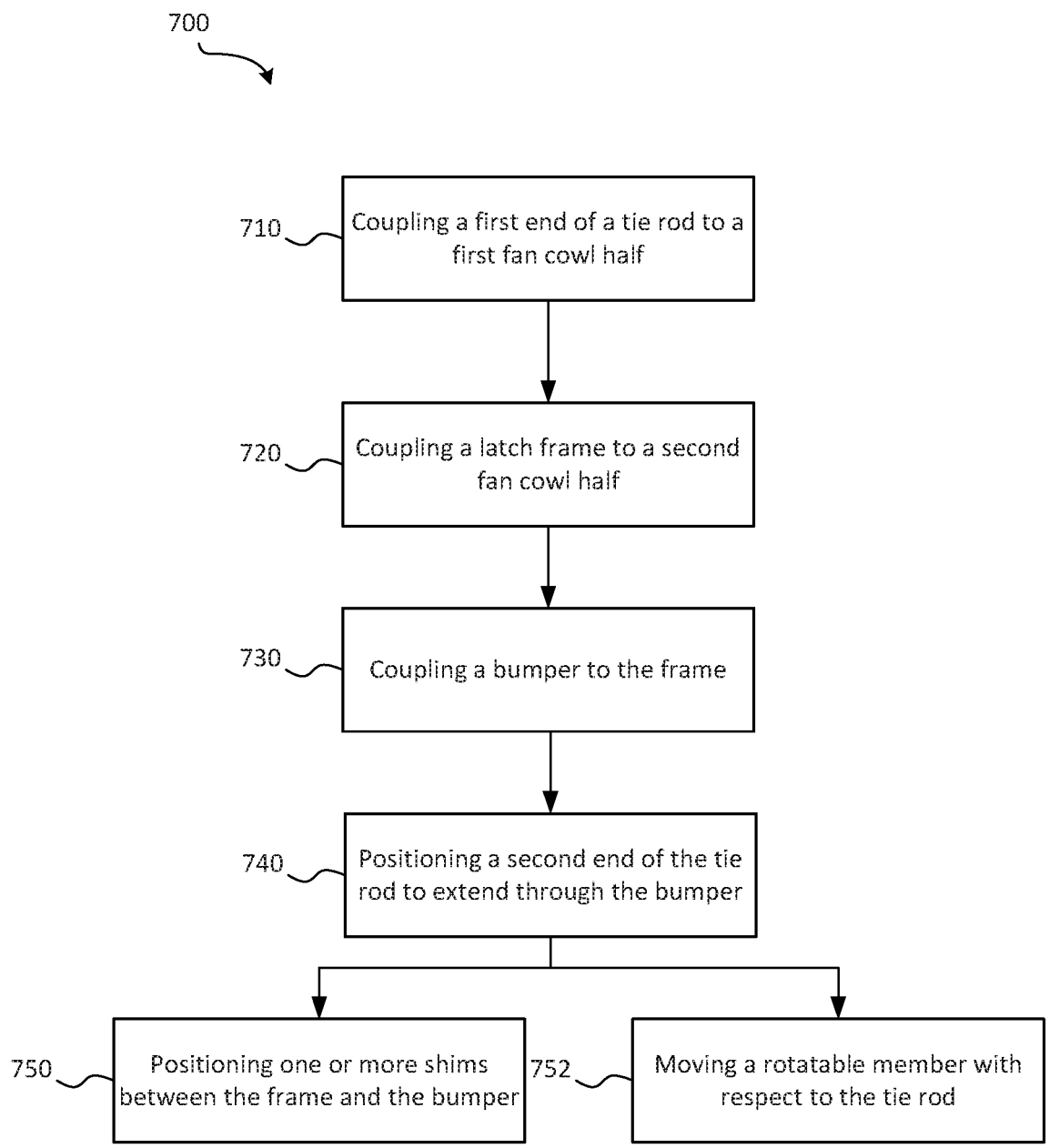
FIG. 7 illustrates a flow chart illustrating a method of installing a fuselage mounted fan cowl arrangement, in accordance with various embodiments.

With reference to FIG. 7, a method 700 for installing a fan cowl arrangement is illustrated, in accordance with various embodiments. Method 700 includes coupling a first end of a tie rod to a first fan cowl half (step 710). Method 700 includes coupling a latch frame to a second fan cowl half (step 720). Method 700 includes coupling a bumper to the frame (step 730). Method 700 includes positioning a second end of the tie rod to extend through the bumper (step 740). Method 700 may include positioning one or more shims between the frame and the bumper (step 750). Alternatively, method 700 may include moving a rotatable member with respect to the tie rod (step 752).

With combined reference to FIG. 3A and FIG. 7, step 710 may include coupling first end 362 of tie rod 360 to first half 310. First end 362 may be coupled to first half 310 via an attachment feature 369. In various embodiments, attachment feature may comprise a spherical bearing. In this regard, first end 362 may comprise a spherical rod end, for example. In this regard, attachment feature may accommodate axial movement of first half 310 with respect to second half 320 via attachment feature 369. Step 720 may include coupling frame 370 to second half 320. Frame 370 may be coupled to second half 320 via one or more fasteners, such as a bolt or rivet, among others. Step 730 may include coupling bumper 380 to frame 370. Step 730 may include inserting one or more fasteners 502 through bumper 380 and frame 370 to secure bumper 380 to frame 370. Step 740 may include positioning second end 364 to extend through bumper 380. Second end 364 may extend through bumper 380 to secure pin 368 of second end 364 to hook 375. Latch handle 376 may be rotated to the closed position to secure pin 368 to hook 375.

In various embodiments, step 750 may include positioning one or more shims 386 between frame 370 and bumper 380 to adjust a distance (e.g., the circumferential distance (i.e., the direction along the Y-axis of FIG. 3A)) between second end 372 of first half 310 and second end 373 of second half 320, with momentary reference to FIG. 3A. For example, adding less shims 386 will decrease the distance between second end 372 and second end 373. In contrast, positioning more shims 386 will increase the distance between second end 372 and second end 373. In this manner, the positioning of seal 212 and seal 222 with respect to pylon 240 may be adjusted, with momentary reference to FIG. 2A.

In various embodiments, with combined reference to FIG. 6 and FIG. 7, step 752 may include moving rotatable member 666 with respect to tie rod 660 to adjust the distance between second end 672 of first half 610 and second end 673 of second half 620. For example, decreasing the length of tie rod 660 will decrease the distance between second end 672 and second end 673 and increasing the length of tie rod 660 will increase the distance between second end 672 and second end 673. In this manner, the positioning of seal 212 and seal 222 with respect to pylon 240 may be adjusted, with momentary reference to FIG. 2A.

In various embodiments, bumper 380 may be made from a metal, such as steel, among others. In various embodiments, shims 386 may be made from a metal, such as steel, among others. In various embodiments, tie rod 360 may be made from a metal, such as steel, among others.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A latch arrangement, comprising:
   a tie rod comprising a first end and a second end, the tie rod comprising a flange comprising a second contacting surface;
   a frame having an opening for receiving the second end of the tie rod;
   a bumper coupled to the frame at the opening, the bumper comprising a first contacting surface;
   a latch handle rotatably mounted to the frame; and
   a hook operably coupled to the latch handle, wherein the latch handle is configured to move between a first position wherein the hook is engaged with the second end of the tie rod and a second position wherein the hook is disengaged from the second end of the tie rod, and
   the hook is configured to pull the second contacting surface of the flange in compression against the first contacting surface of the bumper,
   the bumper and the flange provide a first load path for compressive loads between the tie rod and the frame, and
   the tie rod and the hook provide a second load path for tensile loads between the tie rod and the hook.

2. The latch arrangement of claim 1, further comprising a pin extending from the second end, wherein the hook is configured to engage the pin.

3. The latch arrangement of claim 1, further comprising a plurality of shims disposed between the bumper and the frame.

4. The latch arrangement of claim 1, wherein the tie rod comprises a first rod, a second rod, and a rotatable member whereby the first rod is coupled to the second rod and wherein rotation of the rotatable member with respect to at least one of the first rod and the second rod at least one of increases and decreases a length of the tie rod.

5. An aircraft cowl arrangement, comprising:
   a first half; and
   a second half, wherein the first half and the second half are rotatable between an open position and a closed position;
   a first seal coupled to the first half;
   a second seal coupled to the second half; and
   a latch arrangement for preventing relative movement between the first half and the second half, comprising:
   tie rod comprising a first end and a second end, wherein the first end is coupled to the first half; and
   a frame having an opening for receiving the second end of the tie rod;
   a bumper coupled to the frame at the opening;
   a latch handle rotatably mounted to the frame; and
   a hook operably coupled to the latch handle, wherein the latch handle is configured to move between a first position wherein the hook is engaged with the second end of the tie rod and a second position wherein the hook is disengaged from the second end of the tie rod,
   the hook is configured to pull the tie rod in compression against the bumper, and
   the bumper and the tie rod provide a first load path for compressive loads between the tie rod and the frame, and
   the tie rod and the hook provide a second load path for tensile loads between the tie rod and the hook.

6. The aircraft cowl arrangement of claim 5, wherein the opening is at least partially defined by a first contacting surface, wherein the second end comprises a second contacting surface having a geometry which is complementary to the first contacting surface.

7. The aircraft cowl arrangement of claim 6, wherein the tie rod extends across a pylon in response to the first half and the second half being in the closed position.

8. The aircraft cowl arrangement of claim 7, wherein the first seal and the second seal contact the pylon in response to the first half and the second half being closed.

9. The aircraft cowl arrangement of claim 8, further comprising a wherein the bumper extending extends from the frame at the opening, wherein the bumper is at least partially defined by the first contacting surface.

10. The aircraft cowl arrangement of claim 9, further comprising a flange disposed on the tie rod, wherein the flange is at least partially defined by the second contacting surface, wherein the bumper and the flange provide the first load path for compressive loads between the tie rod and the frame.

11. The aircraft cowl arrangement of claim 10, further comprising a pin extending from the second end, wherein the pin and the hook provide the second load path for tensile loads between the tie rod and the hook.

12. The aircraft cowl arrangement of claim 10, further comprising a plurality of shims disposed between the bumper and the frame.

13. The aircraft cowl arrangement of claim 10, wherein the tie rod comprises a first rod, a second rod, and a rotatable member whereby the first rod is coupled to the second rod and wherein rotation of the rotatable member with respect to at least one of the first rod and the second rod at least one of increases and decreases a length of the tie rod.

14. A method of installing a fan cowl arrangement, comprising:
   coupling a first end of a tie rod to a first half of the fan cowl;
   coupling a frame to a second half of the fan cowl, wherein the frame includes comprises a latch handle rotatably coupled to the frame, and a hook operably coupled to the latch handle, and an opening;
   coupling a bumper to the frame at the opening, the bumper comprising a first contacting surface; and
   positioning a second end of the tie rod to extend through the bumper, the tie rod comprising a flange comprising a second contacting surface, wherein the hook is configured to pull the second contacting surface of the flange in compression against the first contacting surface of the bumper, the bumper and the flange provide a first load path for compressive loads between the tie rod and the frame, and the tie rod and the hook provide a second load path for tensile loads between the tie rod and the hook.

15. The method of claim 14, further comprising positioning one or more shims between the frame and the bumper to adjust a distance between the first half and the second half.

16. The method of claim 14, further comprising moving a rotatable member with respect to the tie rod to adjust the distance between the first half and the second half.

* * * * *